United States Patent Office 2,812,313
Patented Nov. 5, 1957

2,812,313

COPOLYMERS OF AMINO-GROUP-CONTAINING POLYESTERS

Günther Nischk, Leverkusen-Wiesdorf, Erwin Müller and Otto Bayer, Leverkusen-Bayerwerk, and Karl Raichle, Krefeld-Uerdigen, Germany, assignors to Farbenfabriken Bayer Aktiengesellschaft, Leverkusen, Germany, a corporation of Germany No Drawing. Application October 7, 1952, Serial No. 313,591

Claims priority, application Germany October 22, 1951

3 Claims. (Cl. 260—45.4)

The present invention relates to the production of cold-setting copolymers and to the copolymers thus obtained.

In our copending application Serial No. 278,508 filed March 25, 1952, we have described various methods of producing copolymerizable compounds by chemical addition of saturated condensation products or polymers containing free hydroxyl groups to unsaturated compounds. After the addition reaction at least one unsaturated group is to be preserved so as to render possible the copolymerization with polymerizable unsaturated monomeric compounds such as styrene.

Suitable saturated condensation products or polymers according to the above said application are for instance hydroxyl groups containing polyesters, partly or completely saponified hydroxyl groups containing polymers or copolymers of vinyl acetate. Examples of unsaturated compounds to which the above said saturated compounds are added are especially the compounds wherein at least one double bond is preserved after the addition reaction. Such compounds include polyesters of maleic acid, ethylene glycol diacrylate, and hexahydrotriacrylyl-s-triazine.

The unsaturated polymers or condensation products mentioned in the above named copending application can be polymerized with peroxides in the presence of styrene. Polymerization must be carried out at temperatures at which decomposition of the peroxide into radicals occurs. A reaction temperature of 100° C. is to be applied if the polymerization is carried out in the presence of benzoyl peroxide as catalyst. At lower temperatures, for instance at room temperature, the said polymerizable mixtures, reacted with benzoyl peroxide, are storable over a prolonged period.

According to our copending application Serial No. 306,718, filed August 27, 1952, now abandoned, polyester-resins are obtained by copolymerization of unsaturated polyesters and saturated polyesters with vinyl compounds in the presence of peroxides. In this reaction the saturated polyesters probably act as softeners.

We have now found that cold-setting, mostly glass-clear copolymers are obtained already at room temperature and within a shorter period of time by copolymerizing unsaturated or saturated polyesters, for instance those described in our copending applications Serial Nos. 278,508 and 306,718, or any desired mixtures of said polyesters, at least one of said polymers being prepared by condensation of the monomer and a tertiary amine of the following formula

in which R means alkyl, preferably alkyl groups containing 1 to 18 carbon atoms, aryl, preferably phenyl, toluolyl, diphenyl, naphthyl and aracyl or aralkyl, Z means COOH, COO-alkyl, $NH_2$, OH, $x$ means an integer from 1 to 6, with monomeric vinyl compounds in the presence of reaction accelerators. Organic peroxides, for instance benzoyl peroxide and cumene peroxide, are preferably employed as catalysts during condensation.

Tertiary amines which correspond to the above formula include dihydroxy ethyl aniline, dihydroxy ethyl naphthyl amines, dihydroxy ethylamino biphenyls, N-(phenyl-β-hydroxy-ethyl-γ-amino-propyl)amine, N-(phenyl, hydroxyethyl-, carboxylethyl-)amine; furthermore anilino-diacetic acid, p-toluidine-diacetic acid, anilino-diacetic acid dimethylester. Typical examples of condensation products for the incorporation of the said tertiary amines are the soluble unsaturated linear and branched polyesters which are obtainable by condensation in known manner from dibasic and polybasic saturated and unsaturated carboxylic acids and from bivalent and polyvalent alcohols, amino-alcohols and diamines; furthermore, the unsaturated polyesters named in our copending application Serial No. 278,508.

It is, of course, within the scope of our present invention to incorporate the above said tertiary amines also or exclusively in the saturated polyesters which renders possible to conduct the copolymerization reaction at room temperature.

The tertiary amines are incorporated in quantities of 0.01–25 percent calculated on the saturated or unsaturated polyesters. After compounding with styrene and adding benzoyl peroxide copolymerization starts at room temperature. The reaction requires some minutes or some hours to complete depending on the quantity of the peroxide present. The addition of 1 percent of benzoyl peroxide effects polymerization after one hour. Other peroxides such as cumene peroxide and lauroyl peroxide may also be employed.

Heretofore, it has been known only to polymerize unsaturated polyesters with unsaturated, monomeric vinyl compounds in the presence of benzoyl peroxide by incorporating tertiary amines, for instance dimethylaniline, at room temperature. The resultant copolymers always give off a disagreeable odour of tertiary amine and show a high degree of discoloration. Furthermore, undiluted tertiary amines, for instance dimethyl-aniline, give explosive reactions. When the tertiary amine is not intimately mixed with the polymerizable mixture deflagrations of the peroxide readily occur.

The copolymers obtained according to the invention are void of the disadvantages associated with the compounds produced by the hitherto known methods. They fundamentally differ in that tertiary amines are chemically incorporated with the polyesters. The new copolymers are completely odourless and have a minimum of discoloration.

The invention is further illustrated by the following examples without being restricted thereto, the parts being by weight.

*Example 1*

73 parts of adipic acid, 98 parts of maleic anhydride, 74 parts of phthalic anhydride and 125 parts of glycol are condensed under the usual reaction conditions until 50 percent of the water content have been distilled off, thereupon 7.5 parts of dihydroxy ethylaniline are added and the mixture is condensed at an internal temperature of 200° C. until no water distills over any longer. The residual portions of water are distilled off in vacuo at 200° C. under 15 mm. pressure, the temperature is allowed to drop to 160° C. and 0.25 part of hydroquinone is added. After the mixture has cooled to 110° C., 140 parts of styrene are added and the mixture is stirred for about 30 minutes. The solution is reacted with 2 percent of benzoyl peroxide and cast into molds. After about 90 minutes polymerization is complete and the castings can be removed from the molds. The dihydroxy ethylaniline may also be incorporated with the polyester at the beginning. The mechanical properties of the polymer then obtained remain unchanged, however, the procedure described at the beginning of this example is preferred since it provides polyesters which are substantially lighter in shade.

The resins are glass-clear and insoluble in all solvents.

*Example 2*

296 parts of phthalic anhydride, 196 parts of maleic anhydride and 250 parts of glycol are esterified as described in Example 1 and 15 parts of dihydroxy ethylaniline are added after distilling off 50 percent of water. Further esterification is carried out as described in Example 1. When the water content is completely removed the mixture is allowed to cool to 160° C., 0.5 part of hydroquinone is added and the mixture is stirred with 285 parts of styrene at 110° C.

One percent of benzoyl peroxide is dissolved in the copolymerizable solution thus obtained. Polymerization is complete after about 60 minutes. A glass-clear resin which is insoluble in all the usual solvents, is obtained.

*Example 3*

73 parts of adipic acid, 74 parts of phthalic anhydride, 98 parts of maleic anhydride, 125 parts of glycol and 7.5 parts of p-dihydroxy ethylamine-biphenyl are condensed to give a polyester as described in Example 1. The light-yellow polyester is then reacted with 0.25 part of hydroquinone at 160° C. and mixed with 140 parts of styrene at 110° C.

The clear yellow solution obtained is reacted with 1 percent of benzoyl peroxide and polymerized at room temperature for 1 hour. A yellow, glass-clear polymer which is fast to solvents, is obtained.

*Example 4*

296 parts of phthalic anhydride, 196 parts of maleic anhydride, 250 parts of glycol and 15 parts of p-dihydroxy-ethylamino-biphenyl are condensed as described in the preceding example to a polyester which is made copolymerizable by means of 0.5 part of hydroquinone and 280 parts of styrene. By hardening the polyester with 1 percent of benzoyl peroxide at room temperature a glass-clear, light yellow resin which is very fast to solvents is obtained.

*Example 5*

450 parts of the unsaturated polyester obtained according to Example 3 are heated to 100° C. and 200 parts of a saturated polyester are added which is obtained as usual from 876 parts of adipic acid, 1332 parts of phthalic anhydride and 1030 parts of glycol by thermal esterification, 0.85 part of hydroquinone is added and 257 parts of styrene are introduced in a thin jet.

The solution thus obtained is polymerized with 1 percent of benzoyl peroxide at room temperature for 1 hour to a glass-clear, slightly yellowish resin.

*Example 6*

100 parts of a polyester obtained from 876 parts of adipic acid, 1332 parts of phthalic anhydride, 1030 parts of glycol and 15 parts of dihydroxy-ethylaniline are dissolved in 130 parts of styrene and 200 parts of an unsaturated polyester obtained from 876 parts of adipic acid, 888 parts of phthalic anhydride, 1176 parts of maleic anhydride and 1590 parts of glycol are added to the solution at 100° C. The solution is stirred with 3 percent of benzoyl peroxide; polymerization is complete after 3 hours at room temperature.

*Example 7*

While passing through nitrogen 59 parts of phthalic anhydride, 49 parts of maleic anhydride, 106 parts of diglycol and 21 parts of anilino-diacetic acid are esterfied at a temperature gradually rising up to 180° C. until the resultant polyester has the acid number 20. A 50 percent solution of the polyester in styrene is reacted with 0.5 percent by weight of benzoyl peroxide and cast into molds. Polymerization starts with self-heating after about 1 hour. A glass-clear, yellow colored, infusible resin is obtained.

*Example 8*

239 parts of phthalic anhydride, 129 parts of maleic acid, 333 parts of 1.3-butanediol and 82.5 parts of p-toluidino-diacetic acid are condensed to form a polyester of the acid number 13 as described in Example 1. The solution of the polyester in equal parts of styrene becomes more viscous already after 15 minutes and, upon addition of 0.5 percent by weight of benzoyl-peroxide, hardens to a hard, clear, insoluble resin without any perceptible evolution of heat.

*Example 9*

100 parts of a polyester of the acid number 18, obtained by heating 88.8 parts of phthalic anhydride, 34.8 parts of maleic acid, 90 parts of 1.3-butanediol and 23.7 parts of anilino-diacetic acid dimethylester to 180° C., are dissolved in 50 parts of styrene. By admixing 0.5 percent by weight of benzoyl peroxide polymerization starts at room temperature after about 1½ hours. A glass-clear resin which is fast to solvents and shows good mechanical properties is obtained.

*Example 10*

20 parts of the solution of the polyester having the acid number 16, which is obtained from 209 parts of anilino-diacetic acid and 90 parts of 1.3-butanediol in equal parts of styrene, are mixed with 90 parts of the 70 percent solution of an unsaturated polyester in styrene which was obtained from 1552 parts of phthalic anhydride, 522 parts of maleic acid and 1370 parts of 1.3-butanediol. Upon addition of 3 percent by weight of benzoyl peroxide to the resin solution formed the solution gelatinizes after about 1 hour and hardens to a hard, clear resin of good heat resistance with slight self-heating.

By reducing the quantity of benzoyl peroxide to 0.5 percent by weight the solution hardens after 2 hours only.

The hardening procedure may be retarded by addition of substances delaying polymerization such as hydroquinone so that the time within which the catalyzed solution must be worked up can be varied in wide limits. The hydroquinone is preferably dissolved in the melt after formation of the polyesters.

*Example 11*

73 parts of adipic acid, 74 parts of phthalic anhydride, 98 parts of maleic anhydride, 125 parts of glycol and 7.5 parts of methyl diethanol amine are condensed to give a polyester as described in Example 1. The light-yellow polyester is then reacted with 0.25 part of hydroquinone at 160° C. and mixed with 140 parts of styrene at 110° C.

The clear yellow solution obtained is reacted with 1 percent of benzoyl peroxide and polymerized at room temperature for 2 hours. A yellow, glass-clear polymer which is fast to solvents, is obtained.

*Example 12*

73 parts of adipic acid, 74 parts of phthalic anhydride, 98 parts of maleic anhydride, 125 parts of glycol and 10 parts of butyl diethanol amine are condensed to give a polyester as described in Example 1. The light-yellow polyester is then reacted with 0.25 part of hydroquinone at 160° C. and mixed with 140 parts of styrene at 110° C.

The clear yellow solution obtained is reacted with 1 percent of benzoyl peroxide and polymerized at room temperature for 2 hours. A yellow, glass-clear polymer which is fast to solvents, is obtained.

*Example 13*

73 parts of adipic acid, 74 parts of phthalic anhydride, 98 parts of maleic anhydride, 125 parts of glycol and 24 parts of dodecyl diethanol amine are condensed to give a polyester as described in Example 1. The light-yellow polyester is then reacted with 0.25 part of hydroquinone at 160° C. and mixed with 140 parts of styrene at 110° C.

The clear yellow solution obtained is reacted with 1 percent of benzoyl peroxide and polymerized at room temperature for 2 hours. A yellow, glass-clear polymer which is fast to solvents, is obtained.

We claim:

1. The process for the production of copolymers, which comprises reacting in the presence of a polymerization accelerator, a vinyl compound and a polyester obtained by the condensation of a polyhydricalcohol, at least one polycarboxylic acid, at least one of said acids being an ethylenically unsaturated polycarboxylic acid, and a tertiary amine of the following formula $$Z-(CH_2)_x-N-(CH_2)_x-Z$$
$$|$$
$$R$$

in which R is a member selected from the group consisting of an alkyl group containing 1 to 18 carbon atoms, phenyl, toluolyl, diphenyl, naphthyl; Z is a member selected from the group consisting of COOH, COO-alkyl, $NH_2$, OH and $x$ is an integer from 1 to 6.

2. The process for the production of copolymers, which comprises reacting in the presence of a polymerization accelerator, styrene and a polyester obtained by the condensation of a polyhydricalcohol, at least one polycarboxylic acid, at least one of said acids being an ethylenically unsaturated polycarboxylic acid, and a tertiary amine of the following formula $$Z-(CH_2)_x-N-(CH_2)_x-Z$$
$$|$$
$$R$$

in which R is a member selected from the group consisting of an alkyl group containing 1 to 18 carbon atoms, phenyl, toluolyl, diphenyl and naphthyl; Z is a member selected from the group consisting of COOH, COO-alkyl, $NH_2$ and OH; and $x$ is an integer from 1 to 6.

3. The process for the production of copolymers, which comprises reacting in the presence of organic peroxide, a vinyl compound, a polyester obtained by the condensation of a polyhydricalcohol, at least one polycarboxylic acid, at least one of said acids being an ethylenically unsaturated polycarboxylic acid, and a tertiary amine of the following formula $$Z-(CH_2)_x-N-(CH_2)_x-Z$$
$$|$$
$$R$$

in which R is a member selected from the group consisting of an alkyl group containing 1 to 18 carbon atoms, phenyl, toluolyl, diphenyl and naphthyl; Z is a member selected from the group consisting of COOH, COO-alkyl, $NH_2$, OH; and $x$ is an integer from 1 to 6.

References Cited in the file of this patent

UNITED STATES PATENTS

| | | |
|---|---|---|
| 2,452,669 | Levine | Nov. 2, 1948 |
| 2,480,928 | Hurdis | Sept. 6, 1949 |
| 2,558,139 | Knock et al. | June 26, 1951 |